Dec. 23, 1969   M. GRENIER   3,485,053
PROCESS FOR THE PRODUCTION OF A GAS WITH A VARIABLE
OUTPUT BY CONTROLLING THE DEGREE OF REFRIGERATION
IN THE LIQUEFACTION OF STORED GAS
Filed Feb. 28, 1967
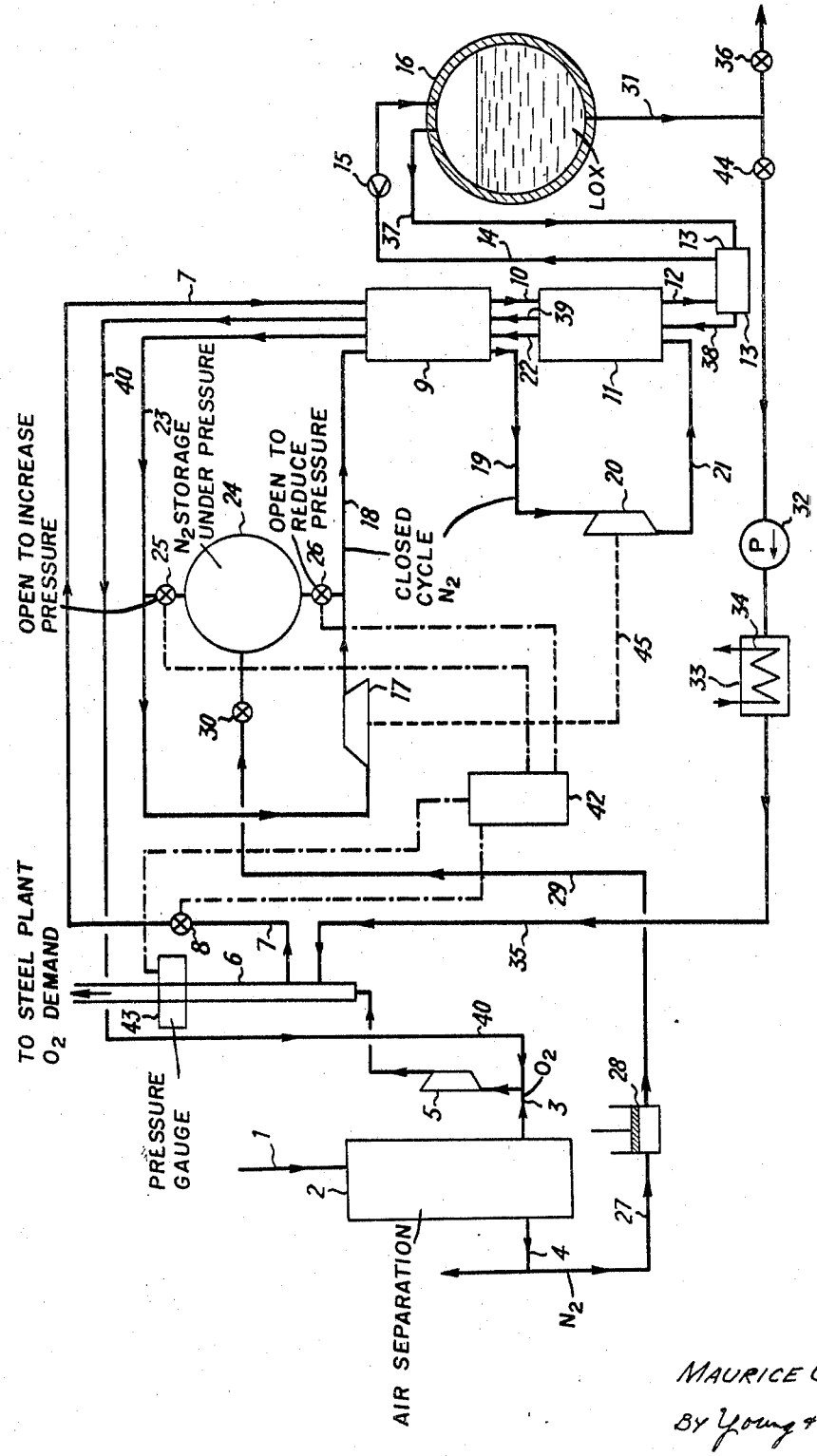
INVENTOR
MAURICE GRENIER
BY Young & Thompson
ATTYS.

United States Patent Office 3,485,053
Patented Dec. 23, 1969

3,485,053
PROCESS FOR THE PRODUCTION OF A GAS WITH A VARIABLE OUTPUT BY CONTROLLING THE DEGREE OF REFRIGERATION IN THE LIQUEFACTION OF STORED GAS
Maurice Grenier, Paris, France, assignor to L'Air Liquide, Societe Anonyme pour l'Etude et l'Exploitation des Procedes Georges Claude
Filed Feb. 28, 1967, Ser. No. 619,214
Claims priority, application France, Mar. 25, 1966, 55,085
Int. Cl. F25j 3/04, 1/02; F17c 7/02
U.S. Cl. 62—13                9 Claims

ABSTRACT OF THE DISCLOSURE

A process for liquefying varying outputs of a main gas such as oxygen by heat exchange with an auxiliary gas, such as nitrogen, flowing in a closed cycle comprising a compression and an expansion with external work, comprising controlling the cold supply to the main gas produced by the expansion with external work of the auxiliary gas according to the output of main gas to be liquefied by varying in the same ratio the admission and exhaust pressures of the expansion with external work.

---

The present invention relates to a process for the production of a gas in a gaseous state under pressure and in the liquid state, with outputs which are variable according to the respective demands, and more particularly to the production of gaseous oxygen under pressure with an output which is variable according to the immediate requirements of steel plants which are consumers, and also liquid oxygen.

In their French Patents No. 1,158,639 of Sept. 25, 1956, and No. 1,166,300 of Feb. 13, 1957, the applicants have already proposed processes which make it possible to maintain a satisfactory functioning of installations for the manufacture of gaseous oxygen with a high output by liquefaction and rectification of air at low temperature, while at the same time causing the output of gaseous oxygen produced to vary within certain limits as a function of the demand. Nevertheless, these processes involve certain complications as regards equipment, particularly the association with rectifying apparatus of two storange reservoirs for liquefied gases, and make the control of the installations more complex.

The present invention is based on a different principle, consisting in employing a reserve of liquefied gas for balancing the fluctuations in the demand. To this end, there is provided an output of this gas (which will hereinafter be called the main gas for greater clarity) under the desired pressure, which output is substantially constant and equal to the average total demand, there is liquefied and added to a reserve in the liquid state an output of this gas substantially equal to the total of the average demand in the liquid state, and of the excess of this gas with respect to the demand in the gaseous state under pressure, when this latter is below its mean value. This gas to be liquefied is heat exchanged with an auxiliary gas flowing through a closed cycle comprising a compression and a cooling by expansion with external work, and there is liquefied and added to the reserve in the liquid state an output of this main gas substantially equal to the average demand in the liquid state, reduced by at least a part of the deficit of this gas with respect to the demand in the gaseous state under pressure, when this latter is above its mean value. It is actually known to effect the liquefaction of a main gas with the aid of a closed cycle of auxiliary gas remaining constantly in gaseous phase, particularly in accordance with U.S. Patent No. 2,909,903, published on Oct. 27, 1959, in the name of Zimmermann, and French Patent No. 1,302,456, of May 30, 1961, in the name of Union Carbide Corporation.

Such a process, however, only permits of the output of liquefied gas to be varied within fairly narrow limits, the capacity of the compression and expansion machines decreasing rapidly when their rate of supply deviates considerably from the optimum rate for which they are designed. The solution which consists in arranging in parallel several compressors and expansion machines and in taking out of service certain of this latter when the output of gas to be liquefied is decidely below the normal output, still does not ensure a best possible functioning in all the range of output to be covered, and necessitates supplementary costly equipment which is not fully utilised.

The process of the invention enables the above disadvantages to be overcome and a demand for gas, and particularly oxygen, which can vary within large proportions, to be met. In particular, it permits of varying quickly, in a ratio of 1 to 3, the supply of cold from the auxiliary gas, permitting the liquefaction of the main gas, and as a consequence the output of the liquefied main gas, with equipment which is simple and easy to control. When the main gas must be obtained by separation of a gaseous mixture, it additionally permits of the separation installation to be caused to function continuously with a constant output, thus avoiding any variation in its running and any temporary lowering of output. It is characterised in that the supply of cold to the main gas, produced by the expansion with external work of the auxiliary gas, is caused to vary by modifying in the same ratio the admission and discharge pressures of the expansion with external work.

The invention preferably also comprises the following methods of operation, separately or in combination:

(a) A reserve of compressed auxiliary gas is maintained, this reserve is discharged into the closed cycle of auxiliary gas when it is desired to increase the supply of cold to the main gas, and this reserve is recharged from the auxiliary gas circulating in the cycle when it is desired to reduce the supply of cold to the main gas;

(b) The main gas is oxygen or nitrogen, and the auxiliary gas is nitrogen;

(c) The expansion with external work is effected in a turbine of which the admission pressure is between 24 bars and 8.5 bars absolute, and the exhaust pressure is between 6 bars and 2 bars absolute;

(d) The pressure of auxiliary gas in the reserve is kept between 8.5 bars and 6 bars absolute;

(e) The oxygen is produced with a substantially constant output by liquefaction and rectification of air at low temperature, and the losses of the nitrogen cycle are compensated for by an addition of nitrogen obtained during the separation of the air and combined with the reserve of compressed nitrogen;

(f) The liquefied main gas is withdrawn from the reserve, brought under pressure, vaporised and reheated, in such a way as to compensate for a part of the deficit of main gas with respect to the demand in the gaseous state under pressure, when this latter is higher than its value;

(g) In the event of momentary stoppage of the operation of liquefaction and rectification of the air at low temperature, liquid oxygen is withdrawn from the reserve and a quantity of liquid oxygen corresponding to the demand is brought under pressure, vaporised and reheated to the gaseous state under pressure.

The substantially constant output of the main gas can be assured by any known process. In particular, when this gas is oxygen, it is preferably obtained, as indicated above, by liquefaction and rectification of air at low temperature. Other separation processes can however be employed, particularly selective diffusion, adsorption or permeation.

Other features and advantages of the invention will become apparent from the following description, given as a non-limiting example, of an installation for producing oxygen on a large scale with an output variable according to the demands of steel plants, and also liquid oxygen.

The process and device of the invention will be described in conjunction with the flow diagram of the figure of the drawing.

The air to be separated, arriving through the conduit 1, is separated into oxygen and nitrogen in the liquefaction and rectification installation at low temperature, for example, of the type manufactured under the trademark "Oxytonne." The oxygen discharged at 3 is delivered by the turbo-compressor 5 under a pressure which is between approximately 30 and 40 bars absolute into the pipe conduit 6 feeding the steel plants.

Branching off from the pipe conduit 6 is a conduit 7 which connects it to the installation for liquefying and storing oxygen, which is intended for ensuring the production of liquid oxygen and for permitting the pipe conduit to respond to the fluctuations in the demand of the plants using it. The output of oxygen is regulated by the valve 8 between a zero value and a value equal to the constant production of the air separation apparatus. The oxygen drawn off is cooled in the exchanger 9 to about −110° C., in counter-current with the nitrogen of the closed cycle expanded with external work and the vapours from the liquid oxygen storage reservoir. It is then introduced through the conduit 10 into the exchanger 11, where it is liquefied in counter-current with the same gases. It passes through the conduit 12 into the exchanger 13, where it is subcooled to −165° C. in heat exchange with the vapours from the storage reservoir. It is finally introduced through the conduit 14 and the expansion valve 15 about atmospheric pressure into the heat-insulated reservoir 16.

The liquid oxygen can be drawn off from this reservoir, for example, for distant deliveries by means of heat-insulated tankers, by way of the pipe 31 and the valve 36, the valve 44 being normally closed.

The supply of cold necessary for the liquefaction of the oxygen evacuated through the conduit 7 is obtained as follows.

The nitrogen of the closed cycle is brought by the compressor 17 to a pressure which is between approximately 8.5 and 24 bars absolute. It passes by way of the conduit 18 to the exchanger 9, where it is cooled to about −110° C., and then through the conduit 19 into the expansion turbine 20. This latter is arranged on the same shaft as the compressor 17, so as to ensure the recovery of the expansion work, as represented diagrammatically by the connection 45. The nitrogen is expanded in the turbine to a pressure between approximately 2 and 6 bars absolute, and is then sent through the conduit 21 to the cold end of the exchanger 11. It assures in this exchanger the liquefaction of the oxygen, and then passes through the conduit 22 into the exchanger 9. Leaving the latter, reheated to about ambient temperature, it passes through the conduit 23 to the intake of the compressor 17.

The regulation of the production of cold of the nitrogen refrigerating cycle as a function of the quantity of oxygen to be liquefied is assured by the pressurised storage vessel 24 connected by the valves 25 and 26 to the conduits 23 and 18, respectively, and operating between the pressures of 6 and 8.5 bars absolute. When it is desired to reduce the admission pressure to the expansion turbine 20, with a view to reducing its cold production, the valve 26 is opened, with the valve 25 closed, so as to collect in the vessel 24 a part of the nitrogen output delivered by the compressor 17. With the expansion ratio of the turbine remaining unchanged, the exhaust pressure of the latter and consequently the admission pressure to the compressor 17 are lowered substantially in the same ratio, the pressure drops in the exchangers 9 and 11 being small relatively to the absolute pressures. When it is desired to raise again the admission pressure to the turbine 20, with a view to increasing the production of cold, the valve 25 is opened, with the valve 26 remaining closed, so as to send to the intake of the compressor 17 a supplementary delivery of nitrogen drawn off from the gas stored under pressure. With the compression rate of the compressor 17 remaining unchanged, its exhaust pressure and consequently the admission pressure to the expansion turbine 20 increases substantially in proportion with the admission pressure of this compressor.

With a view to compensating for the inevitable losses of nitrogen in the closed cycle, a small quantity of nitrogen under pressure can be introduced into the vessel 24, when this becomes necessary. For this purpose, nitrogen drawn off through the conduit 27 from the outlet conduit 4 for the nitrogen from the air separation apparatus is brought by the compressor 28 to a pressure close to the maximum pressure provided for the storage vessel 24, namely 8.5 bars absolute, and is then introduced through the conduit 29 and the regulating valve 30 into this vessel, after a slight expansion, if necessary.

The use of the vessel described above makes it possible for the admission and exhaust pressures at the compressor to be caused to vary substantially in the same ratio between the limits of 2 and 6 bars absolute on admission and 8.5 and 24 bars absolute on exhaust, and as a consequence the admission and exhaust pressures of the expansion turbine are also varied. This enables the production of cold of this turbine to be caused to vary between the nominal value provided for the latter and approximately a third of this value, while maintaining the capacities of this turbine and of the compressor close to their maximum. The amount of nitrogen circulating in the closed cycle, on the other hand, remains relatively small, since it is always in the gaseous state therein and under moderate pressures. It is thus possible to cause very quickly a variation in the operating pressures of this cycle by charging or discharging from the storage vessel under pressure, and as a consequence its cold production and the output of gaseous oxygen liquefied in heat exchange therewith are also varied. This regulation can be effected either manually or automatically, as a function of the degree of opening of the admission valve 8 for the oxygen to be liquefied. It is also possible simultaneously to regulate the admission valve 8 for the oxygen to be liquefied and the valves 25 and 26, as a function of the pressure obtaining in pipe conduit 6, by means of a control apparatus 42 connected to a pressure gauge 43 arranged on the pipe conduit.

If the demand for gaseous oxygen under pressure becomes too high for the oxygen liquefaction circuit to be able to function in satisfactory manner, the output of oxygen in the liquefaction circuit is maintained at the minimum admissible value, and a supplementary supply of gaseous oxygen from the liquid oxygen of the reserve is provided. The valve 44 is then opened and the pump 32 is set in operation. The oxygen is brought to the pressure of the pipe conduit 6 by this pump, then reheated to ambient temperature in the reheater 33 with water circulation 34. It is then returned to the conduit 6 by the pipeline 35.

The vaporisation circuit for liquid oxygen of the reserve can also serve for instantaneously compensating for a reduction in the output of the air separation installation, in the event of stoppage or de-frosting of one of its units.

What I claim is:

1. In a process for the production of a main gas to satisfy a variable demand, in which said main gas is produced continuously at the average demand rate therefor, and a portion of this produced gas is condensed and stored and then withdrawn from storage during periods of high demand to satisfy the excess of that high demand over said average demand, and in which said condensation is effected by heat exchange with an auxiliary gas that flows through a closed cycle comprising a compression and a cooling by expansion with external work, and in which the amount of refrigeration required to effect said condensation varies when demand varies; the improvement comprising sensing a variable indicative of the requirement for said refrigeration, reducing the admission pressure of said work expansion responsive to said sensed variable indicating a reduction in the requirement for said refrigeration, increasing the admission pressure of said work expansion responsive to said sensed variable indicating an increase in the requirement for said refrigeration, and maintaining substantially constant the ratio between the admission and exhaust pressures of said work expansion.

2. A process as claimed in claim 1, in which said increasing and reducing of the admission pressure of the work expansioin is effected by maintaining a reserve of compressed auxiliary gas, discharging gas from said reserve into said closed cycle to increase the admission pressure of the work expansion, and admitting auxiliary gas to said reserve from said closed cycle to reduce said admission pressure.

3. A process as claimed in claim 1, in which said main gas is selected from the class consisting of oxygen and nitrogen, and said auxiliary gas is nitrogen.

4. A process as claimed in claim 1, in which said admission pressure is between 8.5 bars and 24 bars absolute and said exhaust pressure is between 2 bars and 6 bars absolute.

5. A process as claimed in claim 4, in which the pressure of said reserve of auxiliary gas is between 6 bars and 8.5 bars absolute.

6. A process as claimed in claim 3, and producing said main gas by the low temperature liquefaction and rectification of air.

7. A process as claimed in claim 1, and withdrawing condensed gas from said storage in liquid phase, increasing the pressure of said withdrawn liquid phase nad vaporizing the same, and adding the latter vaporized gas to said continuously produced gas to supply high demand.

8. A process as claimed in claim 1, and upon stoppage of said production of main gas withdrawing condensed gas from said storage in liquid phase, increasing the pressure of said withdrawn liquid phase and vaporizing the same, and utilizing the latter vaporized gas to supply demand.

9. Apparatus for controlling the pressure of a main gas in a discharge conduit for this gas, comprising a pressure gauge sensitive to the pressure in the discharge conduit of the main gas, a regulatable valve for producing communication between the discharge conduit upstream of the pressure gauge and a liquefaction circuit for the main gas, a device for producing cold with a variable output, comprising an auxiliary gas storage vessel connected by valves to the inlet and outlet of a compressor, means for heat exchange between the liquefaction circuit of the main gas and the device for producing cold in variable quantity, and control means sensitive to the readings of the pressure gauge, increasing the opening of the regulatable valve, opening the valve connecting the storage vessel to the inlet of the compressor and closing the valve connecting this vessel to the outlet of the compressor, when the pressure in the conduit reaches a fixed maximum value, and on the contrary reducing the opening of the regulatable valve, closing the valve connecting the storage vessel to the inlet of the compressor and opening the valve connecting this vessel to the outlet of the compressor, when the pressure in the conduit reaches a fixed minimum valve.

References Cited

UNITED STATES PATENTS

| | | | |
|---|---|---|---|
| 2,708,831 | 5/1955 | Wilkinson | 62—40 XR |
| 2,909,903 | 10/1959 | Zimmermann. | |
| 3,058,315 | 10/1962 | Schuftan | 62—53 XR |
| 3,144,316 | 8/1964 | Koehn et al. | 62—40 XR |
| 3,243,969 | 4/1966 | Dirk | 62—149 XR |
| 3,273,349 | 9/1966 | Litvin et al. | 62—52 XR |
| 3,319,434 | 5/1967 | Matesanz | 62—50 |
| 3,331,214 | 7/1967 | Proctor et al. | 62—21 |

WILBUR L. BASCOMB, Jr., Primary Examiner

U.S. Cl. X.R.

62—21, 37, 40, 50, 52, 149